United States Patent [19]
Blasingame et al.

[11] Patent Number: 6,048,015
[45] Date of Patent: Apr. 11, 2000

[54] DIFFERENTIAL ACTION RAILROAD CAR WHEELSET

[75] Inventors: Thomas W. Blasingame, Boise, Id.; Robert E. Hord, Jr., Richmond, Va.

[73] Assignee: T.W. Blasingame Company, Inc., Boise, Id.

[21] Appl. No.: 09/004,362

[22] Filed: Jan. 8, 1998

[51] Int. Cl.[7] .................................................. B60B 37/10
[52] U.S. Cl. .................................. 295/44; 295/10; 191/61
[58] Field of Search .............................. 295/10, 36.1, 37, 295/42, 43, 44, 45, 46, 47, 49; 191/61

[56] References Cited

U.S. PATENT DOCUMENTS

| | | | |
|---|---|---|---|
| 12,572 | 3/1855 | Prentiss | 295/10 |
| 50,579 | 10/1865 | Harris | 295/10 |
| 1,141,406 | 6/1915 | Ollard | 191/61 |
| 1,355,575 | 10/1920 | Sederholm | 191/61 |
| 1,463,196 | 7/1923 | Cochran . | |
| 1,532,581 | 4/1925 | Elkins | 295/10 |
| 1,712,750 | 5/1929 | Clasen . | |
| 1,720,457 | 7/1929 | Weckstein . | |
| 1,742,825 | 1/1930 | Sanders et al. . | |
| 1,742,826 | 1/1930 | Sanders et al. . | |
| 1,876,564 | 9/1932 | Buckwalter . | |
| 1,882,231 | 10/1932 | Oelkers . | |
| 2,035,919 | 3/1936 | Proffitt . | |
| 2,039,351 | 5/1936 | Shafer . | |
| 2,046,448 | 7/1936 | Buigne . | |
| 2,049,118 | 7/1936 | Huguenin . | |
| 2,106,345 | 1/1938 | Frede . | |
| 2,364,110 | 12/1944 | Troutman | 295/44 |
| 3,697,119 | 10/1972 | Van Wierst et al. . | |
| 3,802,352 | 4/1974 | Keller . | |
| 4,005,915 | 2/1977 | Canfield . | |
| 4,575,145 | 3/1986 | Wolfram et al. | 295/37 |
| 5,024,165 | 6/1991 | Panagin . | |

FOREIGN PATENT DOCUMENTS

| | | |
|---|---|---|
| 386710 | 4/1932 | United Kingdom . |
| 449430 | 8/1935 | United Kingdom . |
| 2180807 | 4/1987 | United Kingdom . |

OTHER PUBLICATIONS

Paper 7–5; Entitled "Independently Rotating Wheels: A Simple Modification to Improve the Performance of the Conventional Three–Piece Truck"; Ninth International Wheelset Congress, Montreal, Quebec, Sep. 12–15, 1988.— pp. 7–5–1 to 7–5–7.

*Primary Examiner*—Russell D. Stormer
*Attorney, Agent, or Firm*—Zarley, McKee, Thomte, Voorhees, & Sease

[57] ABSTRACT

A railroad car wheelset has an axle with one wheel rigidly attached as in conventional railroad practice. This wheel is permitted to rotate by journal bearings either on the extreme ends of the axle or inboard of each wheel location. At the location of the other wheel, the axle is provided with a smooth surface and a self-lubricating bearing is provided as a part of a hub on the axle. The axle shaft is provided with a boss for preventing the independently rotating wheel from migrating laterally out of proper alignment. A self-lubricating thrust bearing is located between this boss and the side of the wheel to eliminate any possible galling between the two moving surfaces. A removable retainer plate is located on the other side of the independently rotating wheel to prevent the wheel from moving laterally in that direction. Adjacent the removable retainer plate is an electrical contactor which can conduct an electrical current from the wheel to the axle shaft, to permit the wheelset to properly operate railway signals or other systems dependent on electrical continuity. In lieu of the self-lubricated bearings, the bearings can be comprised of a lubricant coating permanently bonded to the bearing surface of the hub adjacent the independently rotatable wheel.

23 Claims, 6 Drawing Sheets

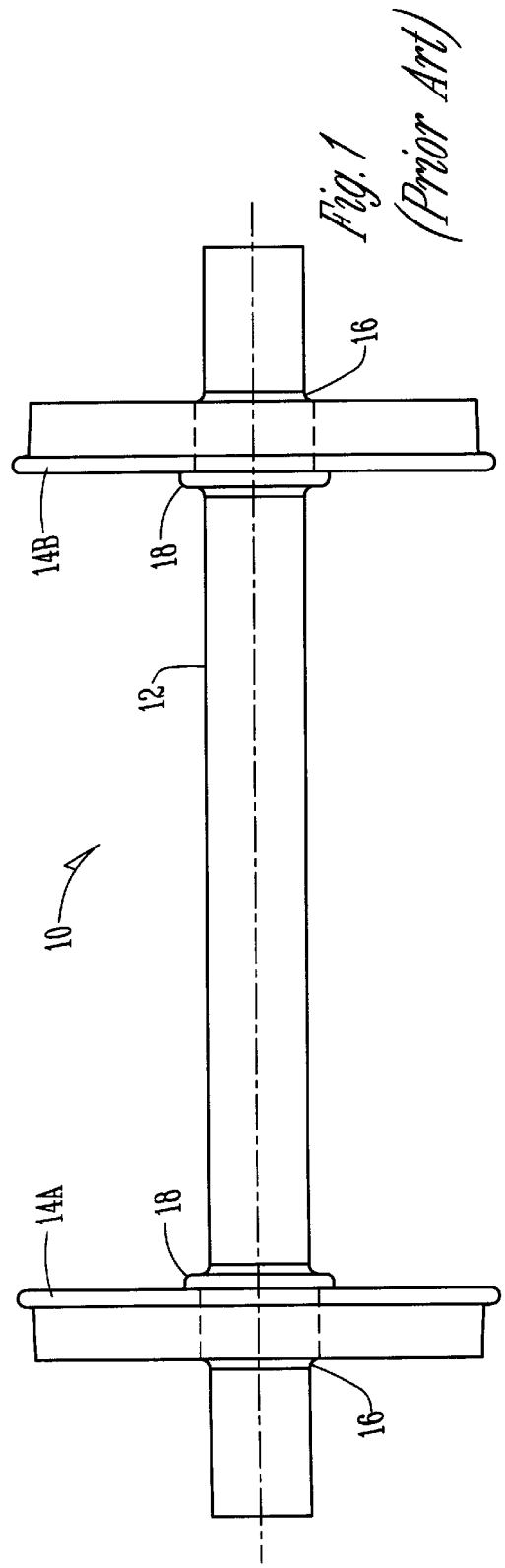
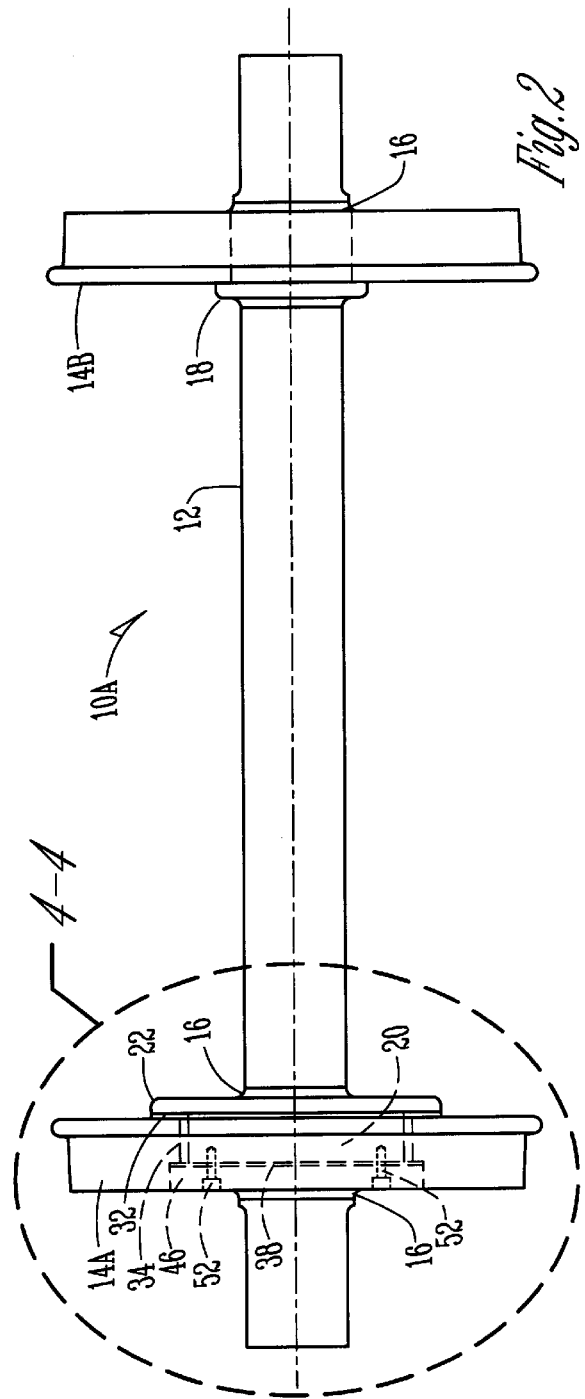

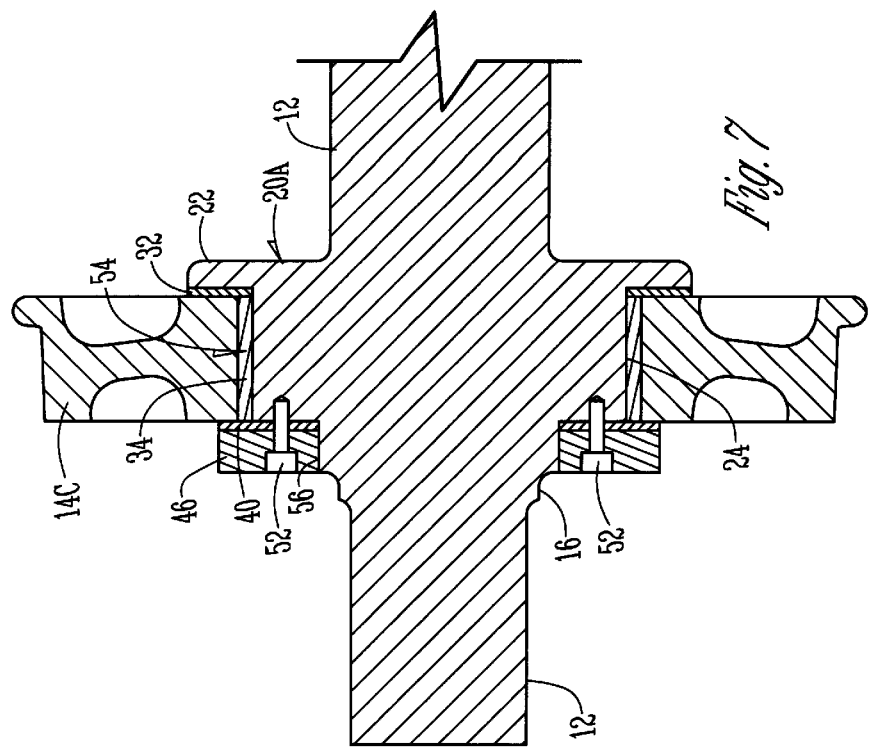
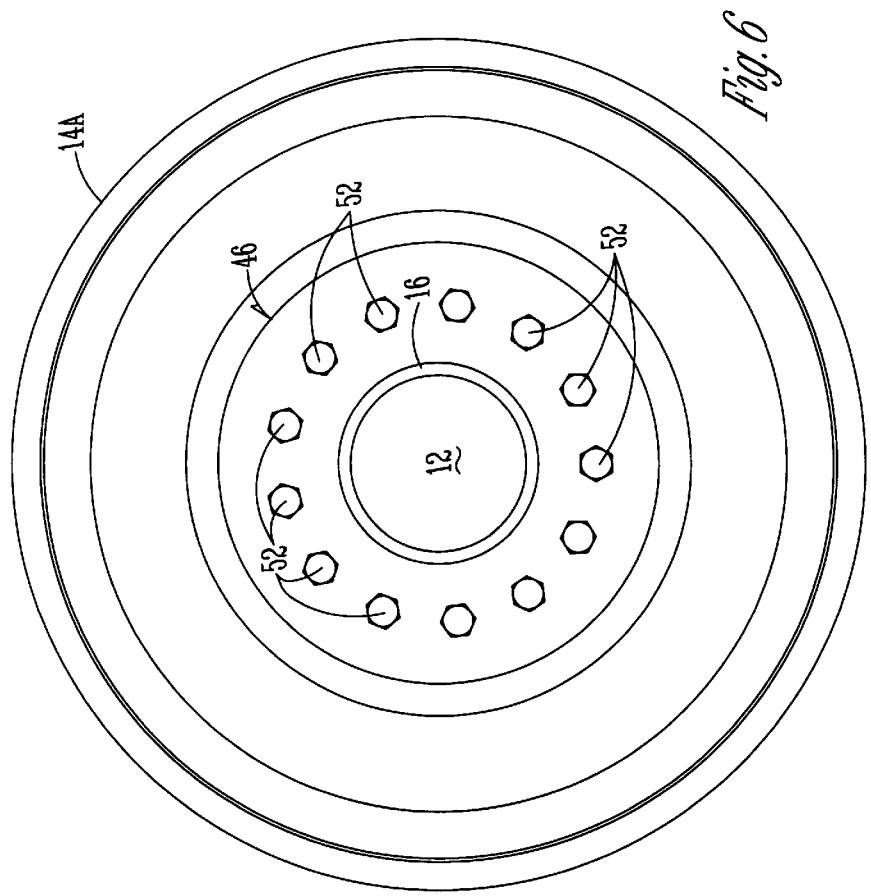

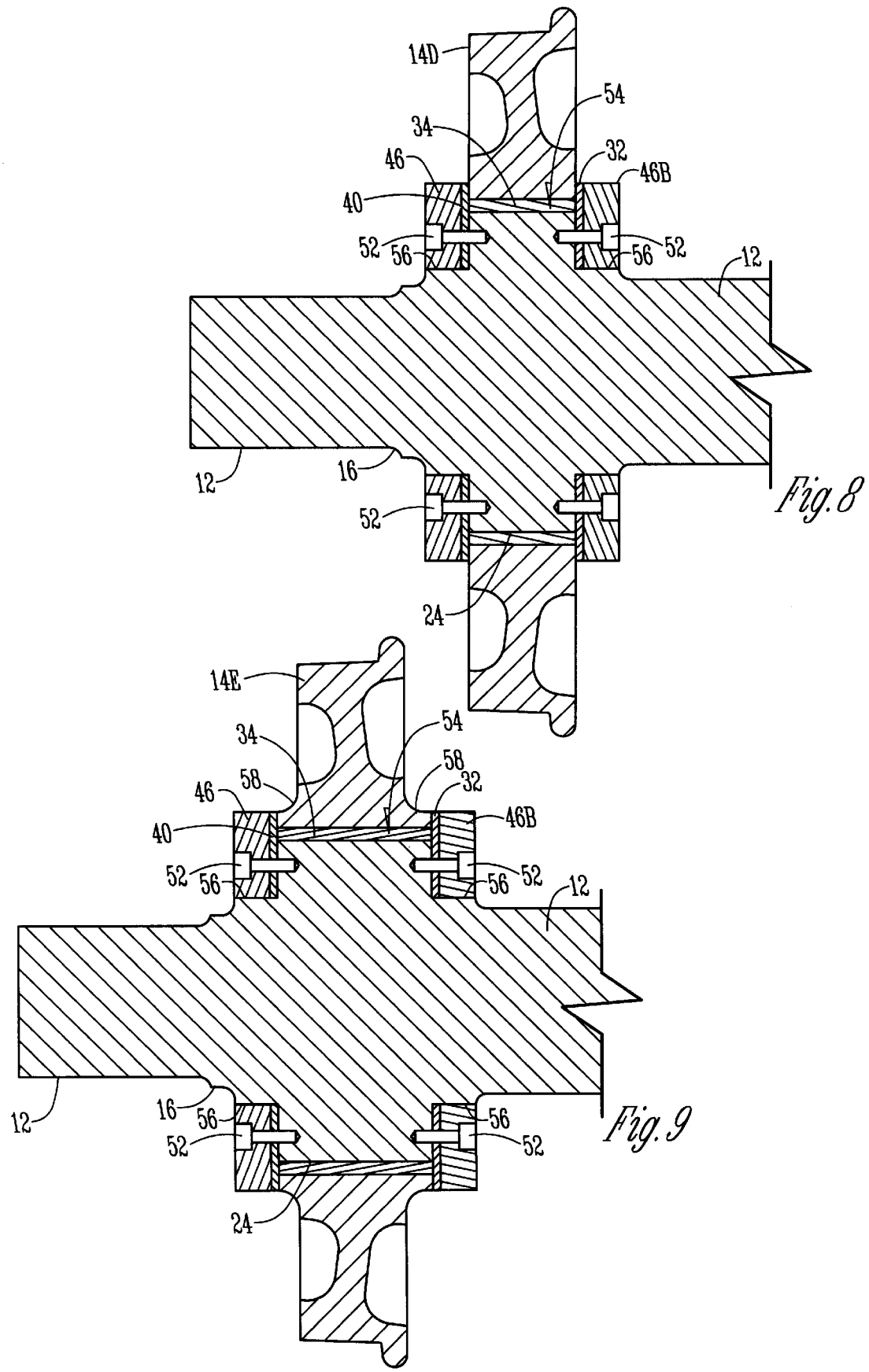

DIFFERENTIAL ACTION RAILROAD CAR WHEELSET

BACKGROUND OF THE INVENTION

Wheelsets for railroad cars are usually comprised of an axle and two wheels. The wheels are pressed on to the axle shaft and are rigidly mounted so that both wheels turn exactly the same degree of rotation during operation. The wheelset assembly may be supported by journal bearings outboard of each wheel or the bearings may be located inboard of the wheels. The rigid assembly of the wheels on the axle and the lack of independent rotation of the wheels is the cause of slippage on the rail when the wheelset operates in curved sections of track. This slippage causes wear on the wheel treads and rails and is a prime cause of corrective maintenance on both the wheels and the track.

Efforts have been made to overcome the problems associated with the rigid assembly of conventional wheelsets by placing bearings between the axle and the wheel on at least one end of the axle to permit differential speeds of rotation of the wheels at opposite ends of the axle. In such cases, a hub is located on at least one end of the axle and a wheel is mounted on the hub or on the axle and its rotation with respect to the axle is facilitated by a bearing assembly. As discussed hereafter, electrical continuity from the two rails through the wheels and the axle is necessary for operation of signal devices or the like. This electrical continuity was established with the conventional railroad wheelsets wherein the wheels were rigidly fixed through opposite ends of the axle. However, with the advent of one of the wheels being mounted on the axle by means of a bearing assembly, the electrical continuity between the wheels was less than perfect. With the advent of non-metal bearings, the electrical continuity was not possible.

A typical signal device for a road crossing, for example which utilizes a crossing arm, flashing lights, and the like, derives electrical energy from any conventional source. A low voltage is imposed on a given dedicated length of rail on opposite sides of the signal, with the opposite rail being electrically connected to the signal whereupon the signal circuit is closed when the wheel assembly of a train initially moves onto the dedicated length of rail. The circuit is completed between the opposite rails through the wheels and axle of the train's wheel assemblies which allow the flow of energy therethrough to electrically connect the opposite rails.

It is a therefore a principal object of this invention to provide a railroad wheelset with independent rotation of wheels with respect to each other which will consistently retain the electrical continuity between the opposite wheels and the rails upon which they are supported.

A further object of this invention is to provide a wheelset with independent rotation of the wheels with respect to each other which can be used in existing truck designs without modification to the truck structures or the braking system.

A still further object of this invention is to provide a railroad wheelset which requires no additional maintenance than conventional rigid wheelsets after installation and during service.

A still further object of this invention is to provide a railroad wheelset with independently rotating wheels in which the differential action is made available with no decrease in safety or reliability.

A still further object of this invention is to provide a railroad car wheelset with independent wheel rotation which can be economically manufactured and applied to railroad cars of all types.

A still further object of this invention is to provide a railroad car wheelset with independent wheel rotation wherein the bearings for the independently rotatable wheel is comprised of a lubricating coating.

These and other objects will be apparent to those skilled in the art.

SUMMARY OF THE INVENTION

The railroad car wheelset of the present invention includes an axle with one wheel rigidly attached as in conventional railroad practice. This wheel is permitted to rotate by means of journal bearings either on the extreme ends of the axle or inboard of each wheel location. At the location of the other wheel, the axle is provided with a smooth surface and a self-lubricating bearing is provided. The axle shaft is provided with a boss or other means of preventing the independently rotating wheel from migrating laterally out of proper alignment. A self-lubricating thrust bearing is located between this boss and the side of the wheel to eliminate any possible galling between the two moving surfaces. A removable retainer plate is located on the other side of the independently rotating wheel to prevent the wheel from moving laterally in that direction. Adjacent the removable retainer plate is an electrical contactor which can conduct an electrical current from the wheel to the axle shaft, to permit the wheelset to properly operate railway signals or other systems dependent on electrical continuity. In lieu of the self-lubricated bearings, the bearings can be comprised of a lubricant coating permanently bonded to the bearing surface of the hub adjacent the independently rotatable wheel.

BRIEF DESCRIPTION OF THE DRAWINGS

FIG. 1 is an elevational view of a conventional prior art railroad wheelset;

FIG. 2 is an elevational view of the preferred embodiment of the railway wheelset of the present invention;

FIG. 6 is an elevational view of the structure of FIG. 4 as viewed from the left-hand side of FIG. 4;

FIG. 7 is a sectional view similar to that of FIG. 5 but shows a first alternative form of the invention;

FIG. 8 is a sectional view similar to that of FIG. 7 but shows a second embodiment of this invention; and FIG. 9 is a sectional view similar to that of FIG. 8 but shows a third embodiment of this invention.

DESCRIPTION OF THE PREFERRED EMBODIMENT

The conventional prior art wheelset 10 is shown in FIG. 1 and is comprised of the horizontal axle 12 with wheels 14A and 14B adjacent its opposite ends. The wheels 14A and 14B are each rigidly secured to axle 12 by being pressed on the axle up against bosses 18, respectively.

Figure 3:
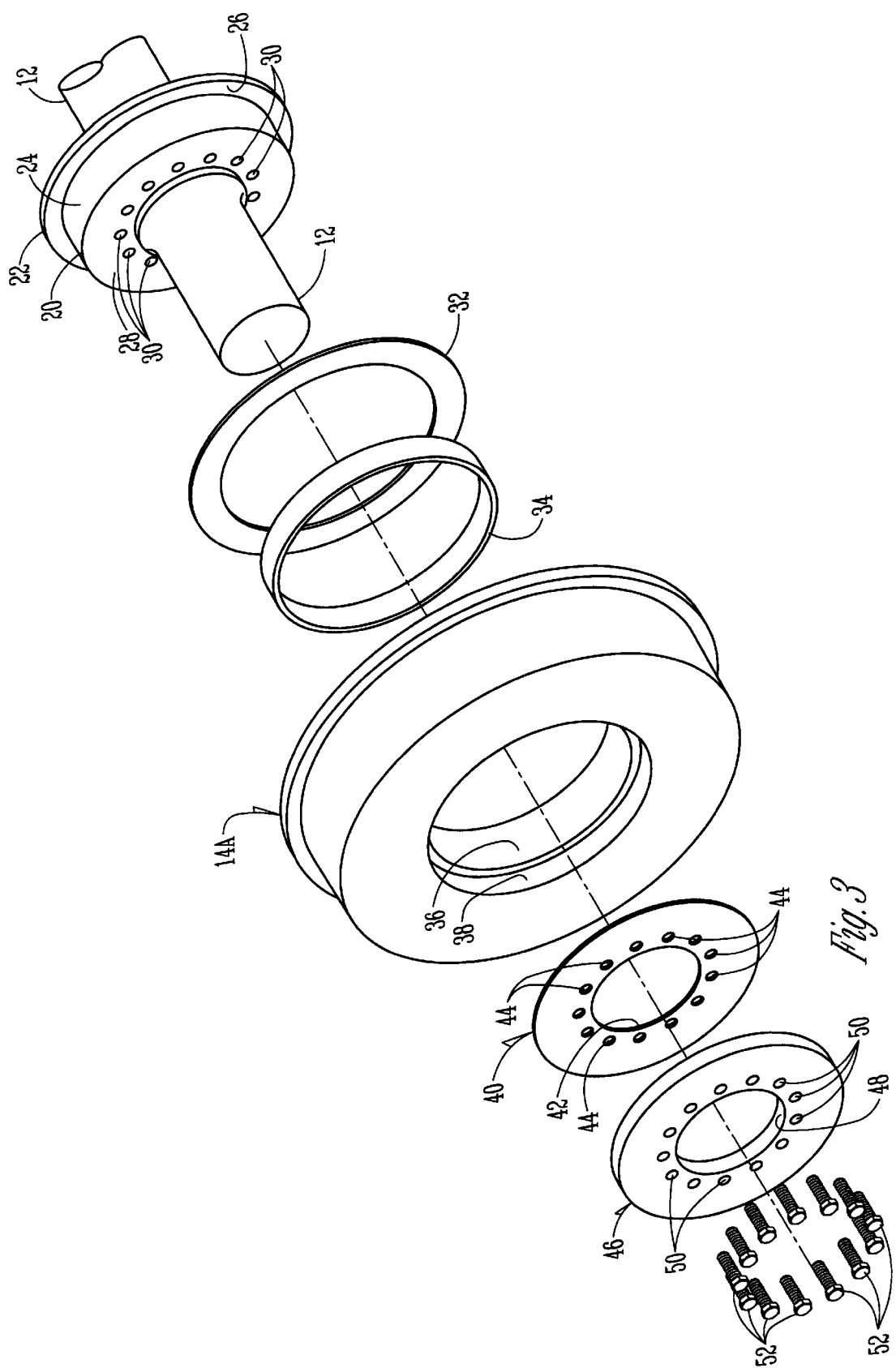
FIG. 3 is an exploded view of the components within the line 4—4 of FIG. 2.
Figure 4:
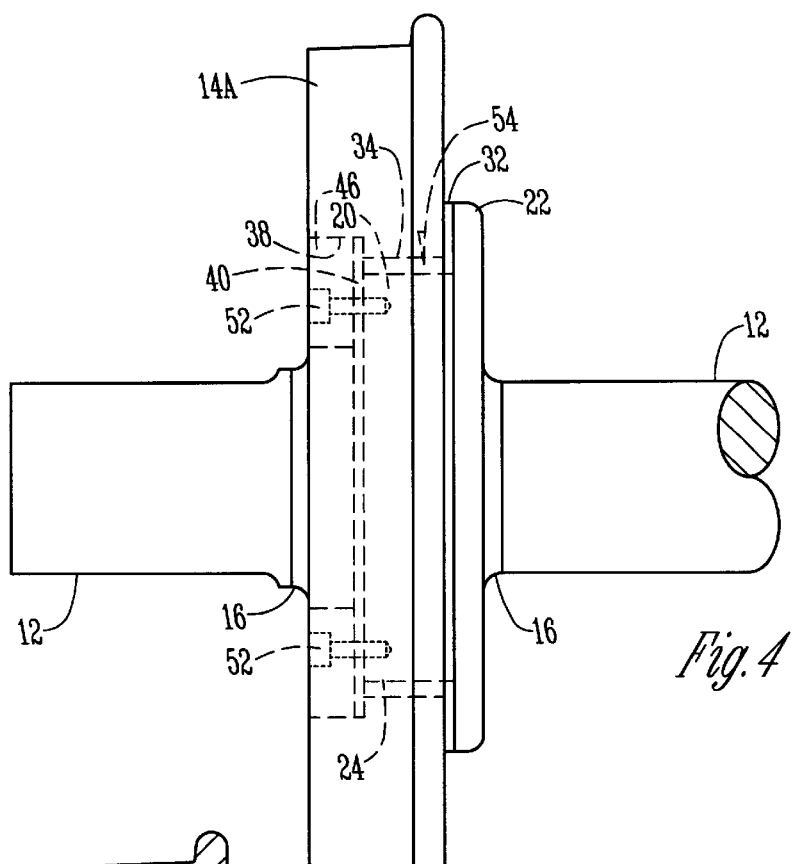
FIG. 4 is an enlarged scale view of the components contained within the line 4—4 of FIG. 2.

The preferred embodiment of this invention is shown in FIGS. 2, 3, 4 and 5. With reference to FIG. 2, the right-hand wheel 14B is affixed to the axle 12 in the same manner that wheel 14B was secured to the axle 12 in FIG. 1. However, at the other end of axle 12 in FIG. 2, a hub 20 is integral with the axle 12. Hub 20 has an annular flange 22 of increased diameter. With reference to FIG. 3, hub 20 has a cylindrical bearing surface 24 and a vertical bearing surface 26 adjacent thereto. A vertical circular face 28 on hub 20 has a plurality of threaded apertures 30.

Figure 5:
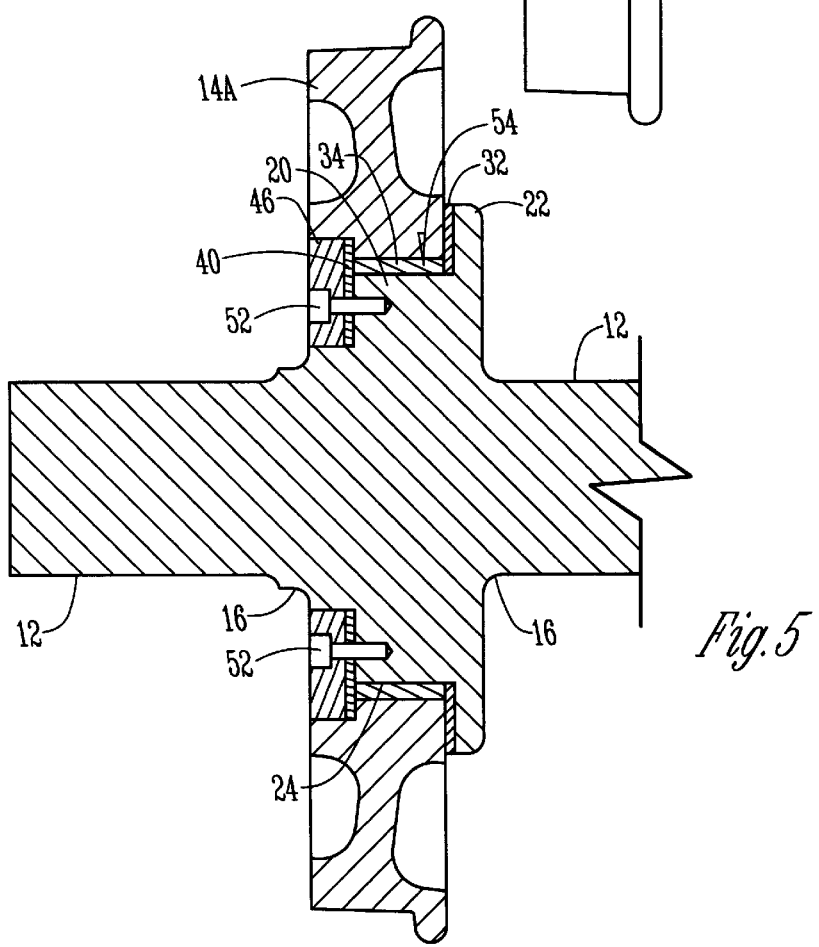
FIG. 5 is a transverse sectional view of the structure of FIG. 4.

A cylindrical flat planar thrust bearing 32 is mounted on bearing surface 24 and when assembled, bears against bearing surface 26. A cylindrical sleeve bearing 34 is then mounted on bearing surface 24 adjacent the thrust bearing 32. In assembly, the wheel 14A which has a large diameter center bore 36 is slidably mounted on the sleeve bearing 34 (FIG. 5). The center bore 36 of wheel 14A has an annular groove 38 on the outboard side thereof. A circular metal conductor plate 40 with the center opening 42 and a plurality of apertures 44 (equal in number and size to apertures 30 in face 38 of hub 20) is mounted within annular groove 38. A retainer plate 46 (FIGS. 3 and 5) is also mounted in annular groove 38. Retainer plate 46 has a center opening 48 and a plurality of apertures 50. Conventional threaded bolts 52 extend through the registering apertures 50 (in retainer plate 46); 44 (in conductor plate 40); and 30 (in hub 20).

Figure 10:
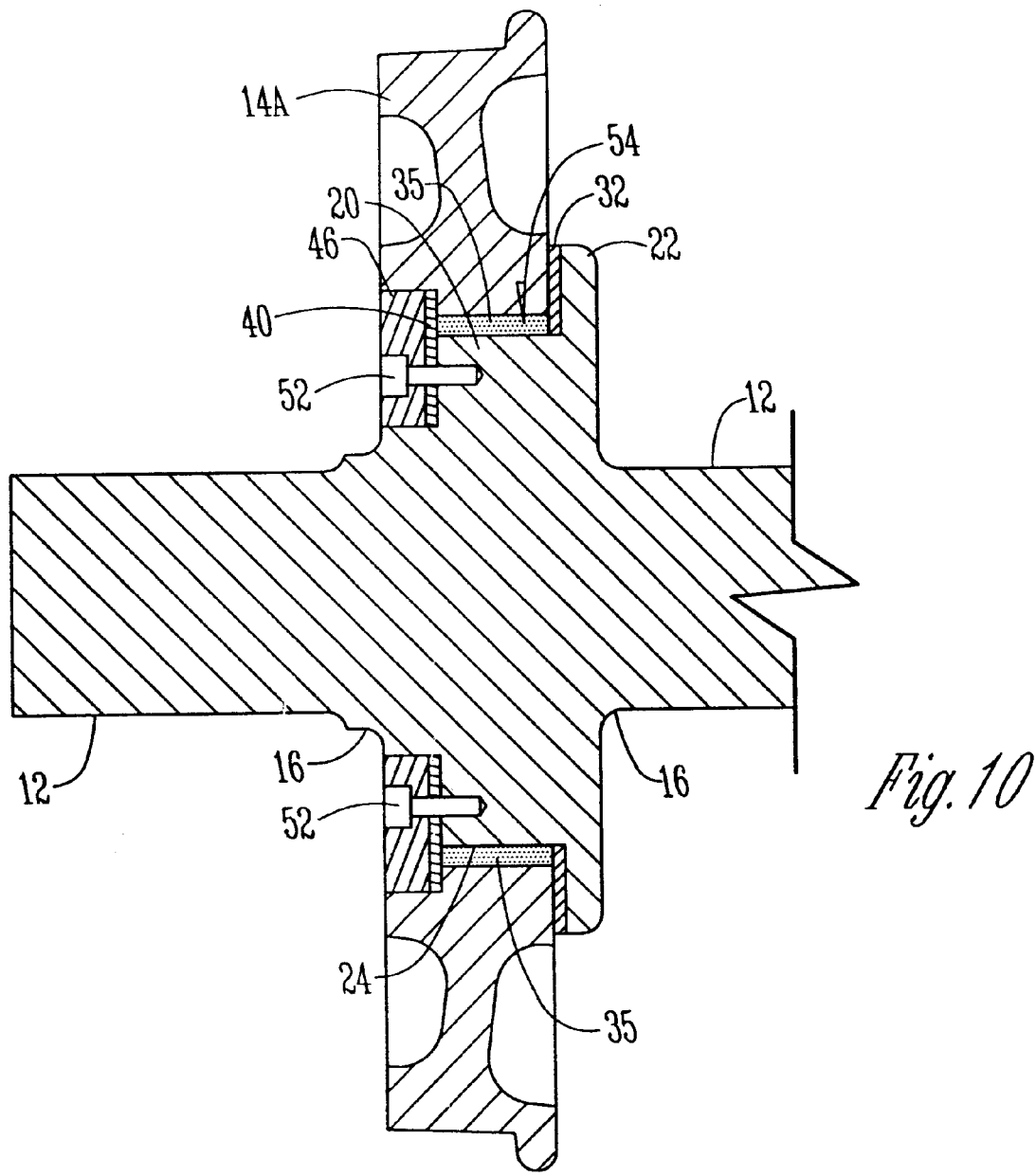
FIG. 10 is a sectional view similar to FIG. 5 showing a lubricant material between the wheel and the hub of the shaft.

It should be noted (FIG. 4) that a space 54 exists between the bearing surface 24 of hub 20 and the center opening or bore 36 in wheel 14A. This space is normally occupied by sleeve bearing 34. However, in an modified form of the invention, the space 54 can be filled with a lubricating coating 35, as shown in FIG. 10, wherein the thickness of the lubricant has been exaggerated for clarity, in lieu of the sleeve bearing 34. Wheel bore 36 can be adjusted in diameter as required.

There are available in the industry synergistic coatings (e.g., Hi-T-Lube®) which become an integral part of the top layer of a base metal rather than merely a surface cover. This lubricating coating has a hard interface metal layer adjacent the base metal; a semi-soft, compressible metal layer adjacent the base metal; a semi-soft, compressible metal layer adjacent the hard interface layer; a hard, thin oxide layer adjacent the compressible layer; and an outer malleable, dry lubricant layer on the outer surface of the thin oxide layer. This lubricating layer can resist wear of the base metal by up to 15 times under cryogenic conditions. This and other lubricating coatings in the industry in environments from room temperature up to 1000 degrees Fahrenheit can withstand high applied loads at relatively high speeds and frequent reversal in direction. Under such conditions, these products performed effectively for long periods of time where other lubricants and combinations of materials failed in a relatively short period of time. The thickness of the coating (and the radial height of space 54) can be in the order of 0.0003 inches–0.001 inches in thickness and has a coefficient of friction in the range of 0.03 and can withstand high compression loads in excess of 150,000 psi. Hardness of available material is up to an equivalent of Rc 55.–$R_c$ 85. These materials are not, per se, a part of this invention and have not been previously used in the application of bearings for railway wheelsets but the present invention makes provision for this technology.

FIG. 7 shows a first alternate embodiment of this invention wherein a railway wheel 14C does not have an annular groove 38 as was the case in the preferred embodiment, but has only an enlarged bearing surface 24 whereupon the conductor plate 40 is mounted on the outboard surface of wheel 14C and is held in place by retainer plate 46. Both the conductor plate 40 and the retainer plate 46 (FIG. 7) are mounted on an extended outer shoulder 56 of hub 20A. Thus, the principal difference between the embodiment of FIG. 7 and the embodiment of FIG. 5 is that the retainer plate 46 and the conductor plate 40 are located on the outboard side of wheel 14C rather than in an annular groove within the wheel as was the case with wheel 14A in FIGS. 4 and 5.

A second alternative embodiment of the invention is shown in FIG. 8 where a pair of annular shoulders 56 extend outwardly from hub 20, with the conductor plate 40 and identical retainer plates 46 and 46B being mounted on both sides of the wheel 14D on the shoulders 56. Retainer plate 46B can be made in two pieces to facilitate assembly.

The third alternative embodiment of this invention is shown in FIG. 9 which is similar to the structure of FIG. 8 except that the wheel 14E in FIG. 9 has a pair of exterior annular shoulders 58 on opposite sides thereof to combine with the shoulders 56 of the structure of FIG. 8 thereby increasing the effective width of the hub to create a much stronger wheel section and increased bearing area.

It should be understood that the space 54 normally occupied in each of the embodiments by a bearing sleeve 34 could be occupied by the lubricating coating described heretofore instead of the sleeve bearing 34.

It is therefore seen that the wheelsets of this invention can be easily assembled and can easily create a wheelset with a single rigid wheel at one end of the axle and an independently rotatable wheel at the other end of the axle. The electrical continuity through the wheelset is guaranteed by the presence of conductor plate 40 which can maintain this electrical continuity without having to pass through the wheel bearings themselves. With reference to FIG. 2, the electrical continuity between the rails upon which wheels 14A and 14B are mounted is completed from the rail under wheel 14B through wheel 14B and thence through axle 12, through conductor plate 40, and into wheel 14A to the opposite rail.

It is therefore seen that this invention will achieve at least all of its stated objectives.

What is claimed is:

1. A railroad car wheelset, comprising, an elongated axle having opposite ends, a raised hub on and adjacent to at least one end of said axle and having inboard and outboard sides, and having a radially extending face, a cylindrical bearing surface on said hub, a wheel having a center bore rotatably mounted on said bearing surface and having a radially extending face, a flange on the inboard side of said hub to prevent inward movement of said wheel on said axle, a retainer plate detachably mounted on the outboard side of said hub to prevent outward movement of said wheel on said axle, and an electrical conducting conductor plate on said axle between said retainer plate and the radially extending face of said wheel to provide electrical contact between said wheel and the radially extending faces of the hub and the wheel.

2. The wheelset of claim 1 wherein a second wheel is rigidly secured to the end of said axle opposite to said raised hub.

3. The wheelset of claim 1 wherein at least one bearing element is on said bearing surface between and engaging said wheel.

4. The wheelset of claim 3 wherein said bearing surface is in a horizontally extending cylindrical plane.

5. The wheelset of claim 4 wherein said bearing surface has a lateral length greater than the cross sectional lateral thickness of said wheel taken adjacent the perimeter of said wheel.

6. The wheelset of claim 3 wherein said bearing surface is in a vertically disposed circular plane.

7. The wheelset of claim 3 wherein said bearing surface is a first bearing surface in a horizontally extending circular plane, and a second bearing surface is on a vertically disposed circular plane, and said bearing element is mounted on said first bearing surface, and a second bearing element is mounted on said second bearing surface, with both of said bearing elements being in contact with said wheel.

8. The wheelset of claim 1 wherein said wheel has generally vertical opposite sides and a center horizontally disposed bore, and said retainer plate is located within said bore.

9. The wheelset of claim 8 wherein said retainer plate is mounted in an annular groove within the center bore of said wheel.

10. The wheelset of claim 1 wherein said wheel has generally vertical opposite sides and a center horizontally disposed bore, through which said raised hub extends, said flange engaging the inboard side of said wheel.

11. The wheelset of claim 1 wherein said retainer plate is bolted to said raised hub.

12. The wheelset of claim 1 wherein said flange is a second retainer plate bolted to said hub.

13. The wheelset of claim 10 wherein a second electrical conductor plate is located on said axle between said second retainer plate and the inboard side of said wheel.

14. The device of claim 12 wherein said retainer plates are mounted on a shoulder extending outwardly from the inboard and outboard sides of said hub.

15. The wheelset of claim 1 wherein said hub and said axle are of integral construction.

16. The wheelset of claim 1 wherein a lubricated coating is permanently bonded to said bearing surface.

17. The device of claim 1 wherein said wheel has a shoulder extending outwardly from the inboard and outboard sides of said wheel to give said wheel and said hub additional stiffness and bearing area.

18. The wheelset of claim 1 wherein a second wheel is rotatably mounted to the opposite end of the axle in the same manner as the first rotatably mounted wheel.

19. The wheelset of claim 1 wherein a second wheel is rotatably secured to the end of said axle opposite to said raised hub.

20. A railroad car wheelset of claim 1 wherein said bearing surface has thereon a hard bearing material permanently bonded thereto.

21. The wheelset of claim 20 wherein said bearing material has a thickness from 0.0003" to 0.001".

22. The wheelset of claim 20 wherein said bearing material is a dry lubricated material.

23. A railroad car wheelset, comprising: an axle shaft, equipped with one or more independently
- rotatable wheels, each wheel having opposite first and second sides;
- first and second retainers mounted on the first and second sides, respectively, of said independently rotatable wheels to prevent lateral motion in either direction,
- a thrust bearing mounted on the first side of each wheel and between each wheel and the first retainers at each wheel, and
- an electrical conductor between the second side of each wheel and the second retainer to provide electrical continuity through each wheel to the axle shaft.

* * * * *